US008150835B2

(12) United States Patent
Boldyrev et al.

(10) Patent No.: US 8,150,835 B2
(45) Date of Patent: Apr. 3, 2012

(54) METHOD AND APPARATUS FOR CREATING AND UTILIZING INFORMATION SIGNATURES

(75) Inventors: Sergey Boldyrev, Söderkulla (FI); Ian Justin Oliver, Söderkulla (FI); Jukka Honkola, Espoo (FI); Antti Tuomas Lappeteläinen, Espoo (FI); Sergey Balandin, Helsinki (FI)

(73) Assignee: Nokia Corporation, Espoo (FI)

( * ) Notice: Subject to any disclaimer, the term of this patent is extended or adjusted under 35 U.S.C. 154(b) by 359 days.

(21) Appl. No.: 12/565,435

(22) Filed: Sep. 23, 2009

(65) Prior Publication Data

US 2011/0072003 A1 Mar. 24, 2011

(51) Int. Cl.
 *G06F 17/30* (2006.01)
(52) U.S. Cl. ........ 707/713; 707/693; 707/705; 707/718; 707/769
(58) Field of Classification Search .................. 707/693, 707/705, 713, 718, 769
See application file for complete search history.

(56) References Cited

U.S. PATENT DOCUMENTS

| | | | |
|---|---|---|---|
| 5,995,961 A | 11/1999 | Levy et al. | |
| 6,213,958 B1 * | 4/2001 | Winder | 600/586 |
| 6,865,577 B1 * | 3/2005 | Sereda | 707/699 |
| 7,162,485 B2 * | 1/2007 | Gottlob et al. | 707/769 |
| 2004/0034628 A1 | 2/2004 | Numao et al. | |
| 2006/0253423 A1 | 11/2006 | McLane et al. | |
| 2007/0005594 A1 | 1/2007 | Pinkas et al. | |
| 2007/0282870 A1 | 12/2007 | Jonker et al. | |
| 2008/0052268 A1 * | 2/2008 | Koudas et al. | 707/2 |
| 2008/0228716 A1 | 9/2008 | Dettinger et al. | |
| 2010/0132036 A1 * | 5/2010 | Hadjieleftheriou et al. | 726/22 |

OTHER PUBLICATIONS

Determining Information Signatures in Smart Spaces, Boldyrev, et al., 2009 IEEE International Conference on Semantic Computing, pp. 291-296.
International search report and written opinion for corresponding international application No. PCT/FI2010/050542 dated Dec. 10, 2010, pp. 1-13.
Multi-query Optimization for Sensor Networks, Trigoni, et al., Distributed Computing in Sensor Systems, Lecture Notes in Computer Science, vol. 3560, 2005, pp. 307-321.
New Algorithms for Finding Irreducible Polynomials over Finite Fields, Shoup, V., 29th Annual Symposium on Foundations of Computer Science, IEEE, 1988, pp. 283-290.
Operations on Spaces of Information, Oliver et al., IEEE International Conference on Semantic Computing, Sep. 14-16, 2009, pp. 267-274.
Ben-Or, M.: Probabilistic Algorithms in Finite Fields. IEEE Xplore, Downloaded: Feb. 10, 2009, pp. 1-5.

(Continued)

*Primary Examiner* — Shahid Alam
*Assistant Examiner* — Andalib Lodhi
(74) *Attorney, Agent, or Firm* — Ditthavong Mori & Steiner, P.C.

(57) ABSTRACT

An approach is provided for efficiently searching information in an information space utilizing information signatures. A signature application receives queries over information sources. The signature application, for each of the queries, generates a polynomial by defining the each query against the information sources as input parameters in polynomial form. The signature application provides irreducible polynomials over a finite field of a degree of orthogonality by factoring polynomials generated from the queries. The signature application adjusts the degree of orthogonality of the irreducible polynomials to provide adjusted irreducible polynomials, each of which is a signature and corresponds to a signature fragment, such that the signature fragments have overlapping portions. The signature application causes at least in part storage of the signatures or the signature fragments in a signature domain over an information space.

20 Claims, 11 Drawing Sheets

OTHER PUBLICATIONS

Berlekamp, E.: Factoring Polynomials Over Finite Fields. Mathematics of Computation, vol. 24, pp. 1-4.

Boldyrev, S., et al.: Determining Information Signatures in Smart Spaces (Abstract). 2009 IEEE International Conference on Semantic Computing, pp. 1-2, http://www.computer.org/portal/web/csdl/doi/10.1109/ICSC.2009.104.

Carroll, J., et al.: Named Graphs, Provenance and Trust. International World Wide Web Conference Committee, May 2005, pp. 1-10.

Ding, L., et al.: Tracking RDF Graph Provenance Using RDF Molecules. Proceedings of the 4th International Semantic Web Conference, Nov. 2005, pp. 1-2.

Dmitriev, A., et al.: Storing and Recognizing Information Based on Stable Cycles of One-Dimensional Maps. Elsevier Science Publishers B.V., vol. 155, No. 8-9, Published: 1991, pp. 1-6.

Dubois, D., et al.: On the Use of Aggregation Operations in Information Fusion Processes. Fuzzy Sets and Systems, 2004, pp. 1-19.

Dubois, D., et al.: Ordinal and Probabilistic Representations of Acceptance. AI Access Foundation, 2004, pp. 1-34.

Grigor'Ev, D.: Two Reductions of Graph Isomorphism to Problems on Polynomials. Plenum Publishing Corporation, Published: 1982, pp. 1-3.

Lassila, O.: Taking the RDF Model Theory Out for a Spin. Nokia Research Center, pp. 1-11.

Ponomaryov, D.: A Decomposability Criterion for Elementary Theories. Siberian Mathematical Journal, vol. 49, No. 1, Published: 2008, pp. 1-3.

Rabin, M.: Efficient Dispersal of Information for Security, Load Balancing, and Fault Tolerance. Journal of the Association for Computing Machinery, vol. 36, No. 2, Published: 1989, pp. 1-14.

Rao, P., et al.: Net-X: Unified Data-Centric Internet Services. pp. 1-6, http://vortex.sce.umkc.edu/psix/icde09.psiX.demo.pdf.

Rao, P., Moon, B.: An Internet-Scale Service for Publishing and Locating XML Documents. pp. 1-4, http://vortex.sce.umkc.edu/psix/icde09.psiX.demo.pdf.

Shoup, V.: New Algorithms for Finding Irreducible Polynomials over Finite Fields. Mathematics of Computation 54, Published: 1990, pp. 1-14.

Shoup, V.: On the Deterministic Complexity of Factoring Polynomials over Finite Fields. University of Wisconsin—Madison, Compurter Science Technical Report No. 782, pp. 1-10.

Thiran, P., et al.: Information Processing Using Stable and Unstable Oscillations: A Tutorial. Third IEEE International Workshop on Cellular Neural Networks and their Applications, Rome, Italy, Dec. 1994, pp. 1-10.

Tummarello, G., et al.: Signing Individual Fragments of an RDF Graph. 14th International World Wide Web Conference, May 2005, pp. 1-2.

Yu, A., et al.: Information Processing in Nonlinear Systems with Dynamic Chaos. International Seminar Nonlinear Circuits and Systems Proceedings, vol. 1, Jun. 1992, pp. 1-6.

\* cited by examiner

METHOD AND APPARATUS FOR CREATING AND UTILIZING INFORMATION SIGNATURES

BACKGROUND

Service providers (e.g., wireless and cellular services) and device manufacturers are continually challenged to deliver value and convenience to consumers by, for example, providing compelling network services and advancing the underlying technologies. One area of interest has been in ways to increase response times for user search queries. As more information becomes available over the Internet, an increasing number of active users are searching information over the Internet leading to tremendous growth in the number of search queries as well as the results of search queries conducted over service provider networks. However, the growth in search-related network traffic can also lead to congestion and reduced response times for delivering results to search queries. Consequently, both service providers and device manufacturers face the challenge of reducing search traffic overload while maintaining full search functionality.

SOME EXAMPLE EMBODIMENTS

Therefore, there is a need for an approach for efficient information search in an information space, namely creating a domain of information signatures and utilizing the information signatures that provide granularity between a document and a basic information unit in the information space.

According to one embodiment, a method comprises receiving queries over information sources. The method also comprises, for each of the queries, generating a polynomial by defining the each query against the information sources as input parameters in polynomial form. The method further comprises providing irreducible polynomials over a finite field of a degree of orthogonality by factoring polynomials generated from the queries. The method further comprises adjusting the degree of orthogonality of the irreducible polynomials to provide adjusted irreducible polynomials, each of which is a signature and corresponds to a signature fragment, such that the signature fragments have overlapping portions. The method further comprises causing at least in part storage of the signatures or the signature fragments in a signature domain over an information space.

According to another embodiment, an apparatus comprising at least one processor, and at least one memory including computer program code, the at least one memory and the computer program code configured to, with the at least one processor, cause the apparatus to receive queries over information sources. The apparatus is also caused to, for each of the queries, generate a polynomial by defining the each query against the information sources as input parameters in polynomial form. The apparatus is further caused to, provide irreducible polynomials over a finite field of a degree of orthogonality by factoring polynomials generated from the queries. The apparatus is further caused to adjust the degree of orthogonality of the irreducible polynomials to provide adjusted irreducible polynomials, each of which is a signature and corresponds to a signature fragment, such that the signature fragments have overlapping portions. The apparatus is further caused to cause at least in part storage of the signatures or the signature fragments in a signature domain over an information space.

According to another embodiment, a computer-readable storage medium carrying one or more sequences of one or more instructions which, when executed by one or more processors, cause an apparatus to receive queries over information sources. The apparatus is also caused to, for each of the queries, generate a polynomial by defining the each query against the information sources as input parameters in polynomial form. The apparatus is further caused to, provide irreducible polynomials over a finite field of a degree of orthogonality by factoring polynomials generated from the queries. The apparatus is further caused to adjust the degree of orthogonality of the irreducible polynomials to provide adjusted irreducible polynomials, each of which is a signature and corresponds to a signature fragment, such that the signature fragments have overlapping portions. The apparatus is further caused to cause at least in part storage of the signatures or the signature fragments in a signature domain over an information space.

According to another embodiment, an apparatus comprises means for receiving queries over information sources. The apparatus also comprises means for, for each of the queries, generating a polynomial by defining the each query against the information sources as input parameters in polynomial form. The apparatus further comprises means for providing irreducible polynomials over a finite field of a degree of orthogonality by factoring polynomials generated from the queries. The apparatus further comprises means for adjusting the degree of orthogonality of the irreducible polynomials to provide adjusted irreducible polynomials, each of which is a signature and corresponds to a signature fragment, such that the signature fragments have overlapping portions. The apparatus further comprises means for causing at least in part storage of the signatures or the signature fragments in a signature domain over an information space.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
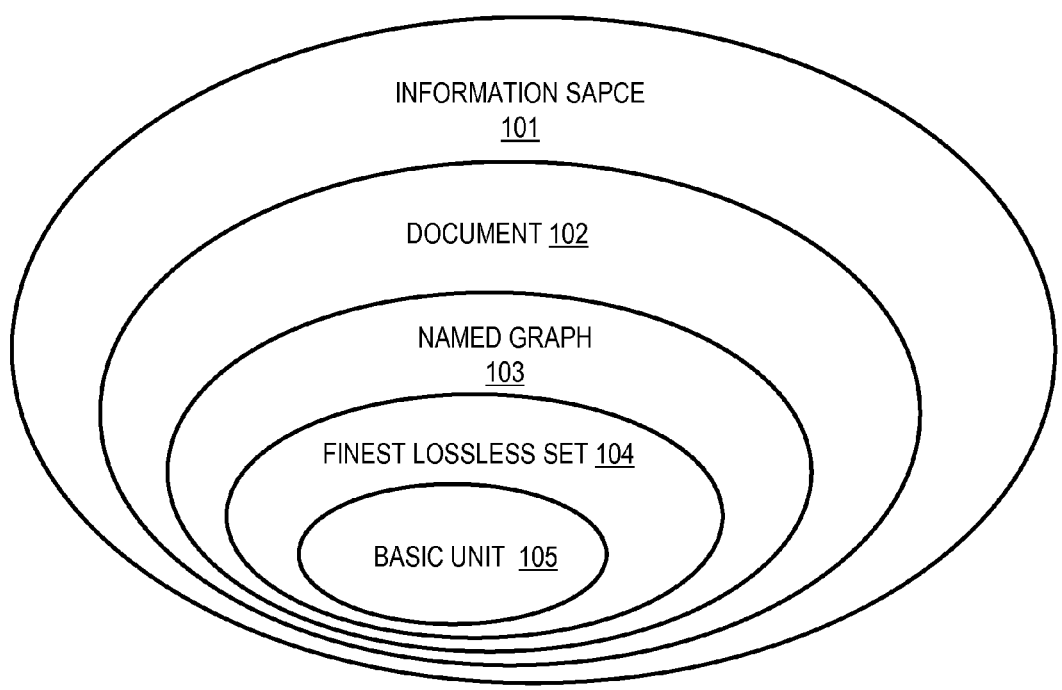
FIG. 1 shows the granularity of an information space, according to one embodiment.

A method and apparatus for efficiently searching information in an information space utilizing information signatures are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Development of efficient search mechanisms for particular information online poses a unique challenge in that there is a voluminous amount of information and the variety of formats (or lack thereof) of these information. For example, the healthcare industry uses one form of semi-structured information (e.g., Acord®), while the banking industry uses another form of semi-structured information (e.g., the Swift® codes). Examples of unstructured information include Resource Description Framework (RDF) files and Excel® spreadsheets. In particular, the information abstraction levels of different information sources vary substantially. Their formats and specifications are also very different, which creates integration issues. In addition, each particular format may include different versions that may be potentially incompatible.

As used herein, the term "unstructured data (or unstructured information)" refers to computerized information that either does not have a data model or has a data model that is not easily usable by a computer program. Unstructured data are different from data stored in a fielded form in databases or annotated (semantically tagged) in documents. Some software programs can create machine-processible structures and exploit linguistic, auditory, and visual structures inherent in different forms of human communication. These inherent structures can be inferred from text, for instance, by examining word morphology, sentence syntax, and other small- and large-scale patterns. Examples of "unstructured data" include audio, video, and unstructured text (such as the body of an e-mail message), Web pages, and word-processor created documents. Most websites and search engines use text-based lexical searches, such that users can find documents only by the words that occur in the documents.

The term "semi-structured data (or semi-structured information)" refers to computerized information that has some sort of data model usable by a computer program. Examples include data that is available electronically in database systems, in file systems (e.g., bibliographic data, Web data), or in data exchange formats (e.g., EDI, scientific data, etc.). Semi-structured data are organized in semantic entities, and similar entities are grouped together. Entities in the same group may not have same attributes, and the order of attributes is not necessarily important. In addition, not all attributes may be required, and sizes of the same attributes in a group and the types of the same attributes in a group may differ.

The term "information space" includes the semantic web and smart spaces as defined later.

The term "semantic web" refers to a universal medium for data, information, and knowledge exchange. This information exchange inserts documents with computer-comprehensible meaning (semantics) and makes them available on the semantic web. The semantic web is a "web of data" instead of the "web of documents." Knowledge in the semantic web is structured and organized at a finer level of granularity than free-text document, and the vocabulary includes not only literal words but also universal identifiers.

The term "smart space" refers to a plurality of information spaces of different entities in a "smart space architecture" that allows the entities and different semantic web tools to access heterogeneous information embedded in different semantic domains available for different semantic web tools as described herein.

FIG. 1 shows the granularity of an information space, according to one embodiment. For example, a search in the information space 101 for a comprehensive profile of a particular person includes searching and integrating knowledge from the person's own documents and others' documents 102 (e.g., RDF documents) that mentioned the person. Here, it is challenging to traverse and navigate in semi-structured or unstructured information. Unlike structured data, semi-structured or unstructured information generally do not have built-in features or functions such as indexing, data labelling, or other like data access techniques. For example, a bank using structured data can retrieve customer account information by account identification numbers. As another example, structured data may include a database index which is a data structure that improves the speed of operations on a database table. As further example, a search engine indexing process collects, parses, and stores data to facilitate fast and accurate information retrieval, with indexes incorporating interdisciplinary concepts from linguistics, cognitive psychology, mathematics, informatics, physics and computer science. Even though there are methods from structured information search which can be utilized in cases of semi-structured or unstructured information search, these methods when applied to semi-structured or unstructured data introduce significant complexity and do not guarantee results in a highly evolving distributed infrastructure, such as in the smart space architecture.

A level finer (e.g., with greater granularity) than the documents 102 are named graphs 103 (e.g., named RDF graphs) which are an extension of the documents 102 that enables the specification of an information representation format or structure through a set of representation statements. The division of statements into sub-graphs is arbitrary. There is no automated process for constructing and naming graphs 103 (which is up to the ontology authors). The concept of finest lossless sets 104 was proposed to provide the optimum level of granularity between the named graphs 103 and the basic unit 105 (e.g., a triple) for tracking graph provenance. "Lossless" means the set 104 can be used to restore the original graph without introducing new finest units; and "finest" means the set 104 cannot be further decomposed into lossless sets.

The basic unit 105 (e.g., triples) is the finest information representation unit in the information space 101. The term "triple" refers to a subject—predicate—object expression in RDF. A subject denotes the resource and is an RDF Uniform Resource Identifier (URI) reference or a blank node, a predicate is an RDF URI reference which denotes traits or aspects of the resource and expresses a relationship between the subject and the object, and an object is an RDF URI reference, a literal or a blank node. For example, one way to represent the notion "the manager went to Finland for a business negotiation" in RDF as the triple is: a subject denoting "the manager," a predicate denoting "went to," and an object denoting "Finland for a business negotiation."

The conventional art takes one information state domain (such as triples, named RDF graphs, or RDF documents) for query searches, provenance tracking, etc. As such, all possible properties are taken only for that taken domain, and natural limitations of the domain are applied to any of the operations within that domain. There is need to create a losslessly mapped domain (i.e., maintaining all information) in order to explore and analyze the properties which are incomputable in the original domain (such as triples 105, named RDF graphs 103, or RDF documents 102), in order to provide faster query searches and more efficient provenance tracking.

Continuing with the prior example, when receiving queries for the particular person's information, the system 200 finds supportive information from different web sources and picks an appropriate level of granularity, to capture the overlapping information of the user from each information source (e.g., sub-graphs between a target RDF graph of the user and each source RDF graph). Before searching within the signature domain, the system 200, for instance, constructs an information gain vector, creates a new domain which is losslessly mapped to a conventional state space, manipulates the new domain to discover new properties including non-decomposable components (e.g., signatures), and then synthesizes the signatures to effectively respond to search queries. Like the finest lossless sets 104, the signatures also lie between a domain of the domain of the named graphs 103 and a domain of the triples 105.

Figure 2:
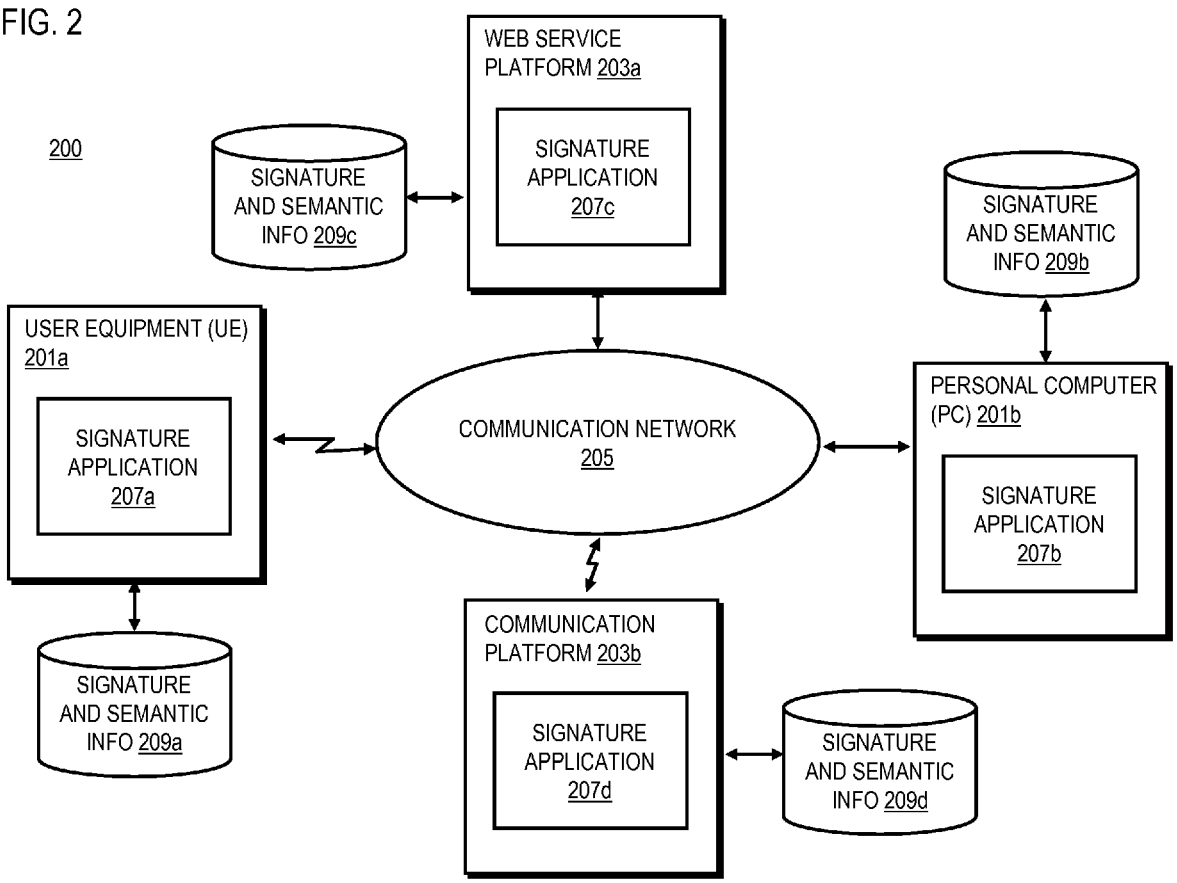
FIG. 2 is a diagram of a system capable of efficiently searching information in an information space utilizing information signatures, according to one embodiment.

FIG. 2 is a diagram of a system 200 capable of creating a signature domain and efficiently searching information in an information space utilizing information signatures, according to one embodiment. The signature domain is composed by signatures each of which corresponds to a signature fragment in the information space 101. Each signature fragment constitutes a finest lossless component in an information representation format or structure that has one or more overlapping portions with other signature fragment(s). Referring back to FIG. 1, a signature fragment is longer than a finest lossless set 104, which is the finest and lossless component of a named graph 103 that has no overlapping portion with other finest lossless sets 104.

By way of example, the system 200 maps a domain of the triples 105 into the signature domain composed by the signature fragments, then uses the mapped state domain (i.e., the signature domain) to explore and analyze the qualitative properties of the information contained in the triples 105. These properties are incomputable in the original state domain (i.e., the triple domain). The creation of the signature domain offers the possibilities to find the qualitative properties of the triple domain and to maintain the initially given information in a more efficient format: signature fragments. The utilization of signature fragments delivers better search results in the information space, especially in a highly evolving distributed smart space architecture as described later. As shown in FIG. 2, the system 200 comprises at least a user equipment (UE) 201a having connectivity to a personal computer 201b, a web service platform 203a and a communication platform 203b via a communication network 205. Each of the UE 201a, the personal computer 201b, the web service platform 203a and the communication platform 203b has respective signature applications 207a-207d and databases 209a-209d for storing signature and semantic information.

Once a set of facts is received at the system 200, that set can be represented as a RDF graph 103 including triples 105. Each fact of a finite deductive closure is indecomposable in that closure. Each fact contains data in the form of triples 105, and the data only form one decomposition component of that closure. This allows determining of the partitioning of the finite deductive closure signature, as well as components of the closure.

In a triple 105 (Subject-Predicate-Object), the "Predicate" is consistent and forms a necessary partial closure orthogonal to any other partial closure signature. The reason is that the "Predicate" shapes the information unit 105 by a purpose and a definition. Thus, the main issue for generating a distributed deductive closure is to provide a "complete image" (i.e., a clustered image) of the "Predicates" throughout all accessible information. To provide relief from the burden of decomposing deductive closures and to provide independence from the consistency of the "Predicates," a set of facts represented by an RDF graph 103 is recognized as a decomposable deductive closure in the frame of one ore more corresponding signatures, if such a deductive closure is in predicate calculus of all sets of the facts of some partial deductive closures with orthogonal signatures. Once the partial deductive closures are joined to each other, they produce a complete deductive closure signature of the RDF graph 103. The composition/decomposition criterion for the distributed deductive closure generation and utilization is described as follows.

Since the process of polynomial synthesis is characterized by orthogonal properties, it is chosen as a mechanism for search in a non-uniform information set defined as semi or unstructured information. Taking the "Predicate" part as a consistent representation of a multitude of any partial closure within all accessible information (since it defines the set of information), and processing facts and queries as follows, an irreducible polynomial can be used as one productization dispersing mechanism. In the signature domain, facts can be inserted/removed, queries can be inserted/satisfied, and persistent queries are particular cases of plain queries via processing of polynomials.

The system 200 starts with constructing an information gain vector thereby characterizing received queries (e.g., in RDF graphs), synthesizing signatures by a productization mechanism, and then adjusting signatures synthesis to include overlapping portions in the signatures by weighing a degree of orthogonality.

The UE 201a can be any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 201a can support any type of interface to the user (such as "wearable" circuitry, etc.).

By way of example, the UE 201a, the personal computer 201b, the web service platform 203a and the communication platform 203b communicate with each other and other components of the communication network 205 using well known, new or still developing protocols,. In this context, a protocol includes a set of rules defining how the network nodes within the communication network 205 interact with each other based on information sent over the communication links The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

By way of example, the communication network 205 of system 200 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

Figure 3:
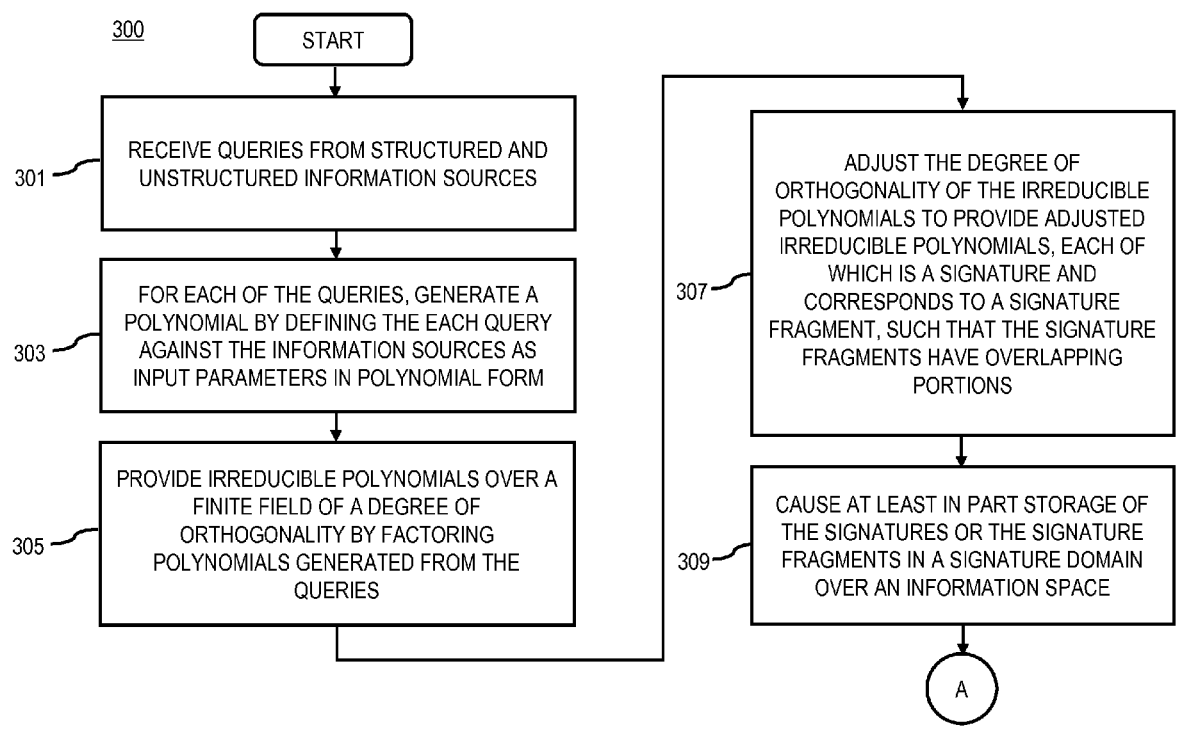
FIG. 3 is a flowchart of a process for creating a signature domain in a smart space thereby discovering new properties and efficiently searching information therein, according to one embodiment.
Figure 11:
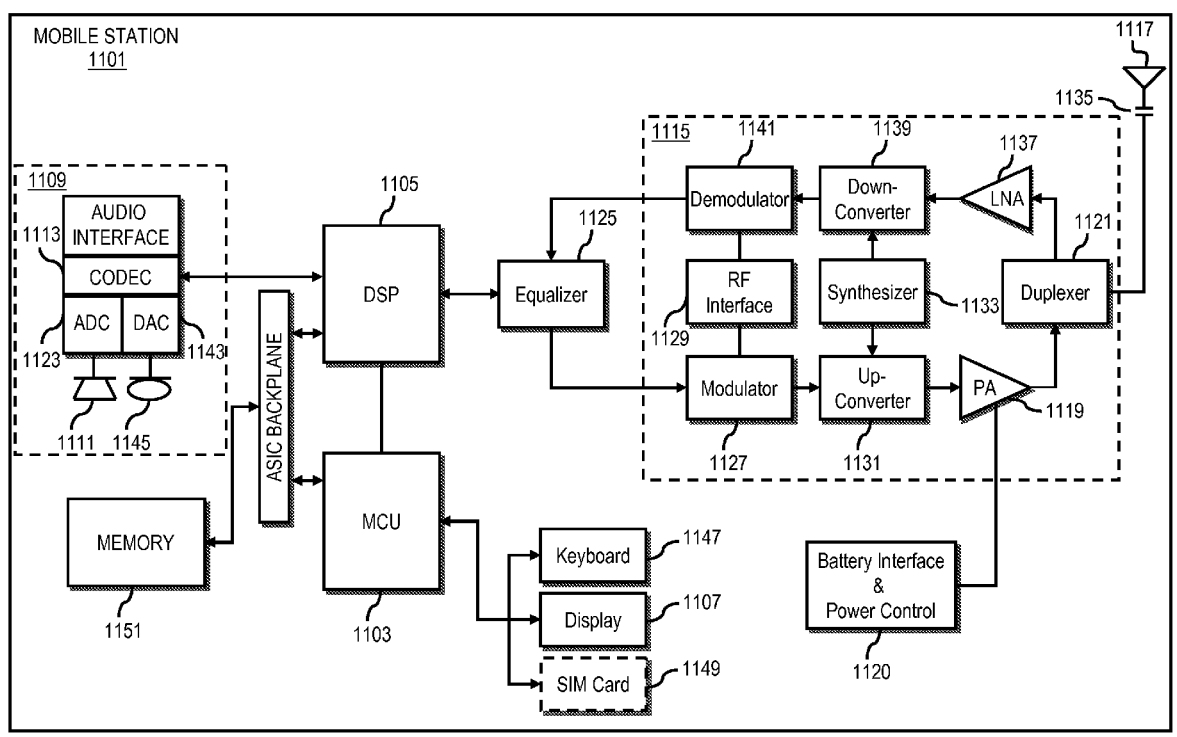
FIG. 11 is a diagram of a mobile terminal (e.g., a handset) that can be used to implement an embodiment of the invention.

FIG. 3 is a flowchart of a process 300 for creating a signature domain in a smart space thereby discovering new properties and efficiently searching information therein, according to one embodiment. In one embodiment, the signature application 207a performs the process 300 and is implemented in, for instance, a chip set including a processor and a memory as shown in FIG. 11. In one embodiment, facts and queries are encoded by vectors, distributed or dispersed in a skewed/non-uniform fashion, taken as input parameters of a polynomial form, as well as aggregated polynomials using the process 300.

In step 301, the signature application 207a receives queries from structured and/or unstructured information sources. For example, the application 207a receives a number of queries over a number of structured and unstructured information sources. Each of the queries is sent for an aggregate response from a respective subset of the information sources at a corresponding query frequency. The signature application 207a, for each of the queries, generates a polynomial by defining the each query against the information sources as input parameters in polynomial form (Step 303). A polynomial is a finite length expression constructed from variables and constants, using the operations of addition, subtraction, multiplication, and constant non-negative whole number exponents. Polynomials are used to form polynomial equations/functions, which encode a wide range of problems in settings ranging from basic chemistry and physics to economics.

By way of example, the information gain of any data is constructed by a set of aggregate queries, and a set of information source readings is constructed as one information gain vector. For example, an information gain vector is constructed from a set of queries (e.g., "A man wore a black T shirt," "The man robed the bank," etc.). Considering an m number of aggregate queries $Q=\{q_1, \ldots, q_m\}$ over a k number of distinct information sources (e.g., the US Library of Congress, the World Bank, etc.), a set of information source readings is expressed as an information gain vector $x=\langle x_1, \ldots, x_k \rangle \in \Re^k$ (a polynomial ring of a k degree). The information sources are defined by means of structured information entities (e.g., in the RDF format) or unstructured information entities (e.g., a binary multimedia stream). Each query requests an aggregate value of a subset of the information sources at a desired frequency, and each query is expressed as a k-bit vector: element j of the vector is 1 if $x_j$ contributes to the value of $q_j$, and 0 otherwise. The value of query $q_j$ on information source readings x is expressed as the product of $q_j$ and x ($q_j \cdot x$). The result is then taken as input parameters of a polynomial form. for example, when the information gain vector x=<2, 1, 1, 1, 1, 0, . . .>, the $q_j$ is expressed as $q_j(x)=x^5+x^4+x^2+x+2$.

The signature application 207a sets each of the queries at an identical query frequency, and constructs regions covered by the queries as an equivalent class.

For each one of the (e.g., k number of) information sources, the signature application 207a provides irreducible polynomials over a finite field of a degree of orthogonality by factoring polynomials generated from the queries q (Step 305). The irreducible polynomial is created with a factoring algorithm, a resulted irreducible factor is represented as the product of a certain number of distinct irreducible polynomials of a defined degree. Factoring rules are used to drive the degree of how large information can diverge around the sources and consumers, physically and logically. Factorization or factoring is the decomposition of an object (for example, a number, a polynomial, or a matrix) into a product of other objects, or factors, which when multiplied together give the original. In all cases, a product of simpler objects is obtained. The aim of factoring is to reduce something to "basic building blocks," such as numbers to prime numbers, or polynomials to irreducible polynomials. Factoring integers is covered by the fundamental theorem of arithmetic and factoring polynomials by the fundamental theorem of algebra. In the signature domain/framework, any valid irreducible polynomial with a corresponding key can serve to create and validate signatures, since it has orthogonality by definition (as polynomial properties).

Continuing with the example, signatures are obtained from the information gain vector x through signatures synthesis. Once the queries are defined against the information sources, assuming that all aggregated queries $Q^I, Q^{II} \ldots Q^k$ (i.e., aggregate queries from the k-th information source) in the workload ("WL") caused by the queries have the same frequency:

$$\frac{1}{Q^I_{WL_1}} = \frac{1}{Q^{II}_{WL_1}} = \cdots = \frac{1}{Q^k_{WL_1}}$$

Then, a union of all regions in the information space covered by the same set of aggregated queries is defined, for example, as an equivalence class ("EC") which forms the information set. To simplify the discussion, the set of aggregate queries is shortened as $\{q_1, q_2, q_3\}$, and its equivalence class forming the information set is shortened as $\{EC_1, EC_2, EC_3, EC_4\}$. The equivalence class is checked to ensure as being covered by $q_2$ and $q_3$, and is represented as $[0,0,1]^T$.

In this example, signature synthesis is done by a productization dispersing mechanism. Each of the resulted irreducible polynomials is used as one productization dispersing mechanism. As mentioned, an irreducible polynomial can be created by means of a factoring algorithm, a resulted irreducible factor can be represented as the product of a certain number of distinct irreducible polynomials of a defined degree. For example, a factor $g(x)=x^2+x+1$ can be constructed from $q_j(x)=x^5+x^4+x^2+x+2$.

After an information stream is created in polynomial form and the equivalence class is checked as mentioned, an irreducible polynomial is deterministically generated over the set of equivalence class of a certain degree. Assuming for each prime q (q|n), a splitting field of $X^q-c$ over a finite field F, the splitting field of $X^q-c$ is the smallest extension of F containing a primitive $q^i$-th root of unity, where m is the smallest positive integer such that q divides $p^m-1$ (p is a prime number, p≠q). Let $m=q_1^{e_1} q_2^{e_2} \ldots q_r^{e_r}$ be the prime factorization of m. The process is to factor a cyclotomic polynomial $\Phi_q = X^{q-1}+\ldots+1$, to obtain an irreducible polynomial of degree m.

The construction of the EC means that there are a sequence of irreducible polynomials $f^{(1)}, \ldots, f^{(k)}$ over a finite field F of degrees $q_1^{e_1}, q_2^{e_2} \ldots, q_r^{e_r}=m$. $f^{(1)}$ is any irreducible factor of $\Phi_q$, and $f^{(i)}$ is any irreducible factor of $f^{(i-1)}(X^q)$, when $i=2, \ldots, r$. The roots of are primitive $q_i$-th roots of a unity. Therefore, the construction of irreducible polynomials is over the finite field F of a degree $q_i^{e_i}$ for i, and these irreducible polynomials have a primitive q-th root of a particular unity in the finite field. The finite field is a cyclic group of order $p^m-1$. As such, the construction is reduced to finding roots of polynomials of the form $X^q-c$ over the finite field F. An irreducible polynomial is deterministically constructed as the product of k distinct irreducible polynomials of degree i in finite field F. The calculations to reduce from factoring at a degree of m to 1 are described in an article by Rabin M. which is entitled "Probabilistic Algorithms In Finite Fields", SIAM Journal on Computing, vol. 9, no. 2, pp. 273-270, which is hereby incorporated by reference The deterministic factoring algorithm and approach described in the article by Rabin M. at el. also gives a deterministically constructed irreducible polynomial that is the product of k distinct irreducible polynomials of degree i in finite field F.

The sequence of irreducible polynomials are then combined together to form an irreducible polynomial f of degree m. A sequence of irreducible polynomials $f^{(1)}, \ldots, f^{(k)}$ in the finite field F of a degree m thus are inductively defined, where the roots are primitive $q^i$-th roots of unity.

The signature application 207a adjusts the degree of orthogonality q of the (e.g., k number of) irreducible polynomials to provide adjusted irreducible polynomials, each of which is a signature and corresponds to a signature fragment, such that the signature fragments have overlapping portions (Step 307). The signature application 207a causes at least in part storage of the signatures or the signature fragments in a signature domain over an information space (Step 309).

Particular information transfer is represented through an "accumulated" set of distinct irreducible polynomials, and is translated into one irreducible polynomial. Thus, a most relevant first-order logic closure, which is a set of information (facts) with redundancy, is represented as a certain form of polynomial (e.g., a "signature"). Each interpretation of first-order logic includes a domain of discourse over which the quantifiers range. First-order logic allows reasoning about properties that are shared by many objects, through the use of variables. Non-logical symbols represent predicates (relations), functions and constants on the domain of discourse. To use different non-logical symbols according to a desired application, it becomes necessary to name the set of all non-logical symbols used in the particular application via signatures.

Therefore, the task of the most common D kernel (deductive closure) is reduced to the task of irreducible polynomial updates. In other words, deductive closure synthesis is an outcome of updateable irreducible polynomial. Since these updates are done in aggregated fashion and each update can be easily monitored and checked against usefulness, if any of the updates cannot contribute any useful information during the D kernel generation, that irreducible factor is ignored as well as those relevant dispersed facts (in a form of codewords). The deterministic factoring algorithm described in the article by Rabin M. et al. and the process described in an article by Dubois D. and Prade H. which is entitled "On The Use Of Aggregation Operations In Information Fusion Processes" Fuzzy Sets and Systems 2004, pages 142, 143-161, which is hereby incorporated by reference, to provide a deterministically constructed irreducible polynomial of a degree m in the finite field F. Therefore, the task of the common information closure calculation is reduced to the task of irreducible polynomial updates. The updated irreducible polynomial can be used to track the allocation for the certain information distributed in the network and be incorporated into the set of aggregate queries (i.e., target information). In other words, the updated irreducible polynomial can be used to optimize a query and an information location.

Through adjusting the signatures synthesis mechanism to accept overlapping by weighing a degree of orthogonality, the signatures (e.g., irreducible polynomials) are generated to navigate the information space. A "signature" is to be used as building blocks and a backbone of a search mechanism. Each of the signatures (e.g., irreducible polynomials) in the signature domain corresponds to a signature fragment (e.g., a data stream) in the information space. The approach of the finest lossless set 104 ensures the storage of the finest lossless sets is fundamentally "orthogonal," i.e., there is no intersection of the finest lossless sets 104. On the other hand, the above-described embodiments adjust the signatures synthesis mechanism to accept overlapping, thereby enabling weighing and an adjustable degree of orthogonality. Any further checking against consistency of synthesized polynomials and aligning the synthesized polynomials with dissemination and aggregation policies/strategies can be done according to an the article by Dubois, D. et al. The processes for disseminating and aggregating signatures of the described embodiments adopt the same breakpoints as described in the Dubois article.

The following features are used to drive the process of mapping two information state spaces: (1) factoring rules (used to derive the degree of how large information can diverge around the sources and consumers, physically and logically), (2) signatures (with orthogonality to navigate in the signature domain), and (3) synthesis (a signature recombination process to control the granularity of a search extent).

Any of the transitive closure generation process discussed above is "correlated" in the sense of "one step joint closure." A transitive closure provides the ability to express a function that generates new statements. Normally, a transitive closure produces both existing and new statements. In other words, the closure has a "degree" of orthogonality no more than one unity at the moment of creation. As such, at any moment once the closure generation is dropped, information fragments are easily recombined and aggregated to serve any other query. The search process is thus minimized down to the one unity processing. Additionally, the search is successful in terms of valid polynomial value, once the information fragment that was searched is represented by signatures. The "degree" of orthogonality is driven by the least meaningful information fragment. Beside signatures, an equivalent class or a the finest lossless set 104 can be sued as the least meaningful information fragment.

During querying, processing results must be merged in order to eliminate duplicate representations. This requires the disambiguation and identification of blank nodes. A blank node (or anonymous resource or bnode) is a node in an RDF graph which is not identified by a universally unique identifier and is not a literal. For example, in the statement that "a man robbed the bank," "the man" is represented as a blank node in a RDF graph since he is anonymous. As each blank node's scope exists only within the enclosing document, they are not globally addressable. RDF graphs 103 can be combined in a unified graph as well as decomposed into their constituent sub-graph. However, in order to avoid information loss, the logical relations between graph nodes need to be preserved during the process. The presence of Blank Nodes complicates RDF graph 103 decomposition since blank nodes do not come with universally unique identifiers. A blank node is a node that is not a URI reference or a literal. In the RDF abstract syntax, a blank node is just a unique node that can be used in one or more RDF statements, but has no intrinsic name. Blank nodes from different RDF graphs are assumed to be different by default; however there is no way to recognize whether two blank nodes represent the same or different things. The problem of addressing blank nodes was tackled by decomposing an RDF graph 103 losslessly into a set of the finest lossless sets 104 which then are used to distribute updates to graphs.

The process 300 transforms information from the RDF graph domain to the signature domain. This signature domain creates an efficient framework for traversing or navigating through information sets therein, and provides a baseline for searching a particular information fragment therein. Traversing a graph allows a query to return values, based on a predicate, by following up or down a hierarchy of statements. In a schema language such as RDF schema, these hierarchies are expressed as a sub-class or sub-property predicate. Traversing a graph 103 is performed with the walk function within a where clause.

To navigate within the signature domain, the rules and terms of an n-dimensional phase space is applied. Therefore, any search task converges to the process of observing the state space by means of slicing, attracting a particular phase trajectory of a "signature" or recombining a set of "signatures", and fetching the attracted "signature" or set of "signatures."

Figure 4:
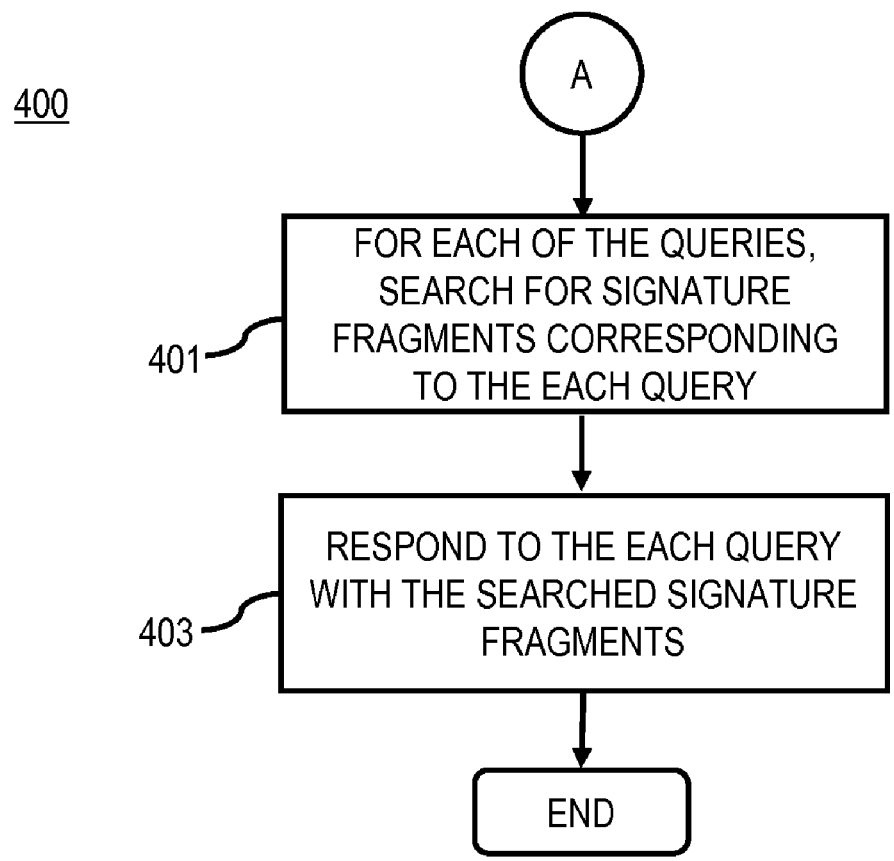
FIG. 4 is a flowchart of a process for responding to search queries with signatures, supersignatures or a combination thereof, according to one embodiment.

FIG. 4 is a flowchart of a process 400 continuing after the process in FIG. 3 for responding to search queries with signatures, according to one embodiment. In one embodiment, the signature application 207a performs the process 400 and is implemented in, for instance, the chip set including a processor and a memory as shown FIG. 11. In step 401, for each of the queries, the signature application 207a searches for signature fragments corresponding to the each query. The signature application 207a then responds to the each query with the searched signature fragments (Step 403).

In yet another embodiment, since any orthogonal set of polynomials can be combined/synthesized into larger superpolynomial (i.e., supersignature) as well as can be decomposed into finer grained polynomials, any superpolynomial (i.e., supersignature) can represent an attractor in the signature state space. The signature application 207a uses combined signatures to control the granularity of the search extent (i.e., the smart space 300).

Figure 5:
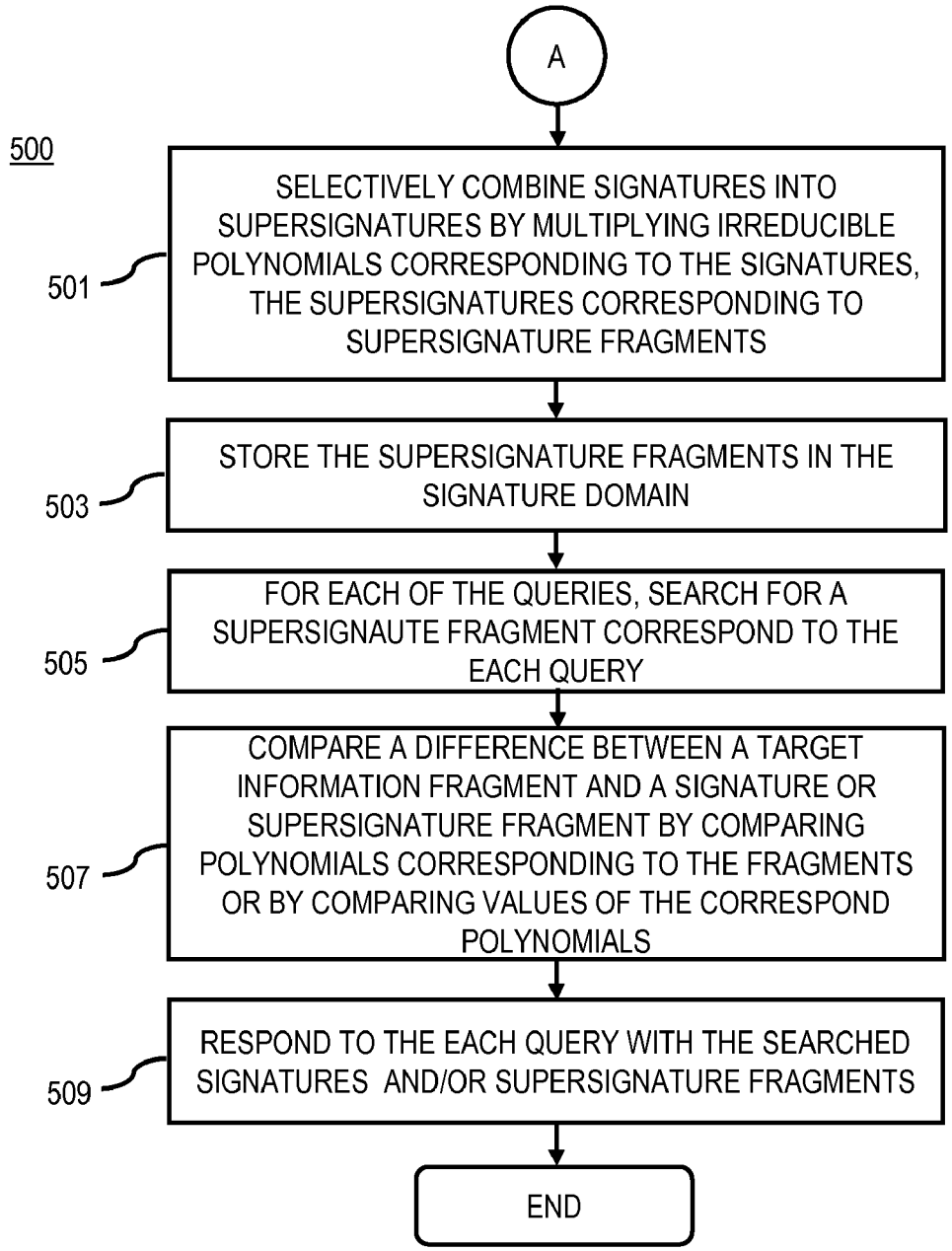
FIG. 5 is a flowchart of a process for reconstructing an m number of queries from the supersignature fragment, according to one embodiment.

FIG. 5 is a flowchart of a process 500 continuing after the process in FIG. 3 for responding to search queries with signatures, supersignatures or a combination thereof, according to one embodiment. In one embodiment, the signature application 207a performs the process 500 and is implemented in, for instance, the chip set including a processor and a memory as shown in FIG. 11. In step 501, the signature application 207a selectively combines signatures into supersignatures by multiplying irreducible polynomials corresponding to the signatures, the supersignatures corresponding to supersignature fragments. The signature application 207a then stores the supersignature fragments in the signature domain (Step 503). For each of the queries, the signature application 207a searches for a supersignature fragment correspond to the each query (Step 505), and compares a difference between a target information fragment and a signature or supersignature fragment by comparing polynomials corresponding to the fragments or by comparing values of the correspond polynomials (Step 507). Thereafter, the signature application 207a responds to the each query with the searched signature fragments, the supersignature fragments, or a combination thereof (Step 509). The supersignature fragments are longer than the signature fragments and, thus, contain more information. The use of supersignature fragments further reduces the storage space and accelerates the searches.

Figure 6:
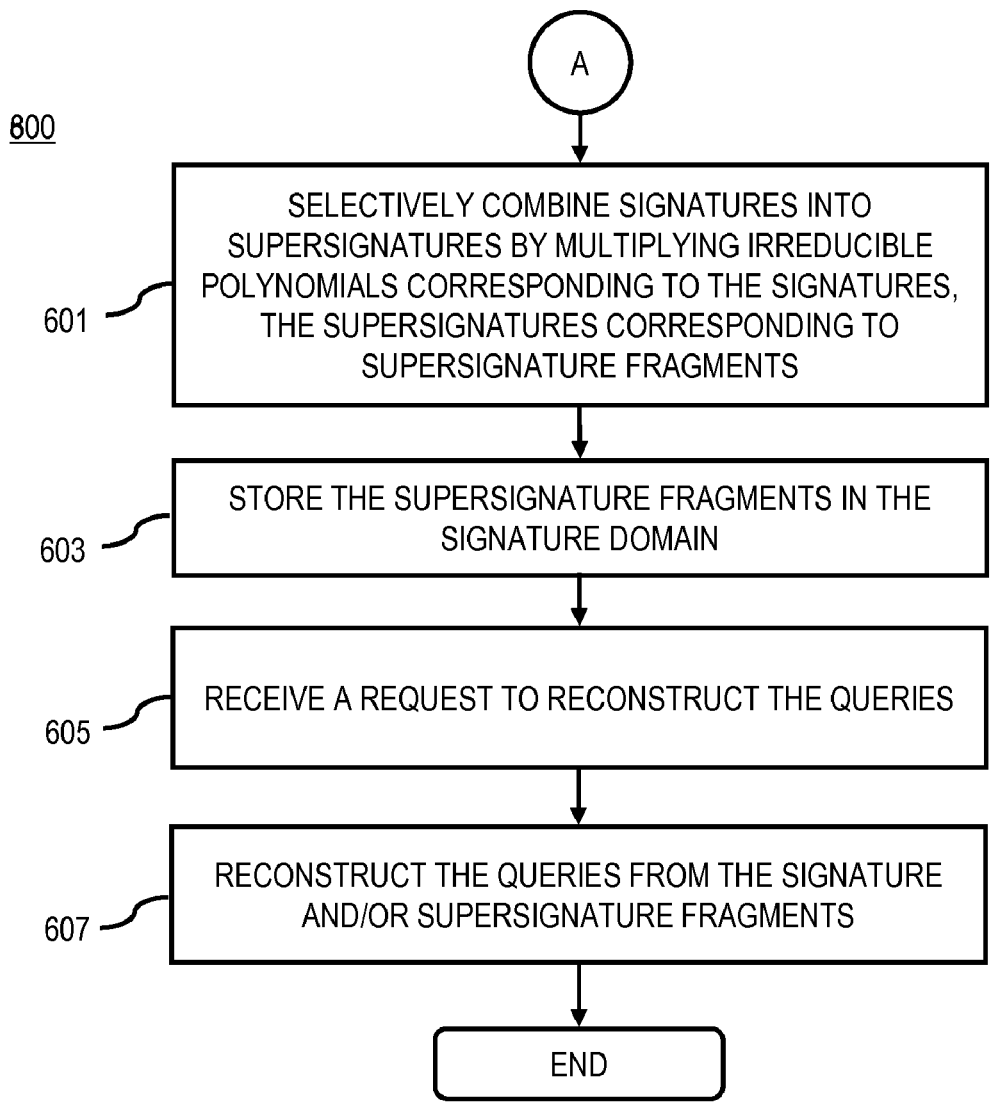
FIG. 6 is a flowchart of a process for reconstructing an m number of queries from the supersignature fragment, according to one embodiment.

FIG. 6 is a flowchart of a process 600 continuing after the process in FIG. 3 for reconstructing the m number of queries from the supersignature fragment, according to one embodiment. In one embodiment, the signature application 207a performs the process 600 and is implemented in, for instance, the chip set including a processor and a memory as shown in FIG. 11. In steps 601-603, the signature application 207a performs the same operations as in Steps 501-503 of FIG. 7. The signature application 207a receives a request to reconstruct the m number of queries (Step 605). In response the application 207a reconstructs the m number of queries from the signature fragments, the supersignature fragments, or a combination thereof (Step 607). For example, "A man wore a black T shirt" and "The man robed the bank" can be combined into "The man robbed the bank wearing a black T shirt".

In another embodiment, the system 200 constructs an attractor/trajectory for a series of signatures. Since any orthogonal set of polynomials (signatures) can be combined into a larger superpolynomial (supersignature) as well as to be decomposed into finer signatures, any superpolynomial (supersignature) can represent an attractor in the signature domain or a trajectory (i.e., a geometry of a path over time) as the domain evolves.

Trajectory traversing (e.g. viewing or recognizing) of a targeted information fragment in the signature domain is done either by slicing (e.g., via Poisson methods, multimodal tracking) or by emphasizing any particular "aspect" (rules, queries etc) thereof. Navigation in the signature domain is implemented through trackable values of the supersignature, and a distance to a targeted information fragment is measured by either disparity between the searched supersignature and/or signature, or by means of a value of the corresponding superpolynomial and/or polynomial.

Figure 7:
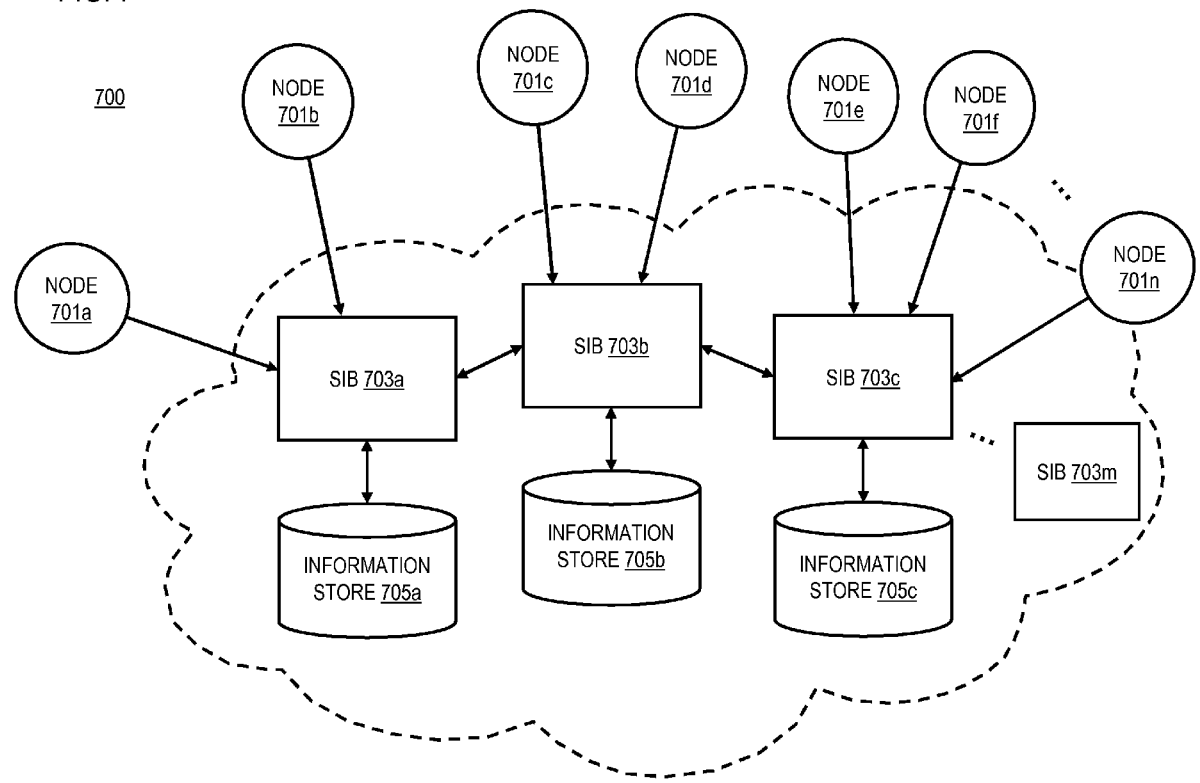
FIG. 7 is a diagram of a smart space architecture, according to one embodiment.

FIG. 7 is a diagram of a smart space architecture, according to one embodiment. The semantic web is designed to share information based upon common representation formats, ontologies and semantics, such that information would become globally ubiquitous and interoperable. However much of the information (e.g., personal information) is not desired to be ubiquitous and should remain hidden or private. For example, this information can be protected by using, accessing, or otherwise interpreting the information locally where the owner of the information can more readily protect or control the data. To address to this issue, a smart space architecture (an entity focused structure) is developed such that a user can encapsulate all of personal information and interact with the information in the smart space according to the user's individual semantics and needs. By way of example, the user can be a person, an organization, or other entity.

In one embodiment, a smart space is an aggregated information set containing information from different information sources. For example, the user's personal smart space may contain the user's personal information, family information, work information, social network information, etc., which come from a variety of sources including, for instance, the government, the user's doctors, employers, classmates, family, friends, business contacts, associations, etc. This multi-sourcing nature provides flexibility in that an identical piece of information can come from different information sources. However, the information can contain unstructured and semi-structured information in different formats of different versions. The signature fragments facilitate information integration in the smart space.

As seen in FIG. 7, each smart space is distributed across at least one set of nodes belonging to at least one user. In this embodiment, the smart space 700 is distributed across multiple nodes 701a-701n that each belong to multiple users. For example, nodes 701a and 701b belong to a first user, while nodes 701c-701f belong to a second user. It is also contemplated that one or more of the nodes (e.g., node 701n) may belong to a centralized information provider. Nodes 701 are personal/individual in that they perform tasks either directly decided by the user or autonomously for or on behalf of the user. For example, the nodes 701 can monitor predetermined situations or reason/data-mine information available in the smart space 700.

A node 701 may connect to one or more smart spaces 700 at a time. Moreover, the specific smart spaces 700 and to which the node 701 is connected may vary over the lifetime of a node. Mobility of nodes 701 is provided by moving links to the smart space 700 rather than moving a physical running process of the smart space 700. The node 701 can save its state and become 'mobile' when another node 701 restores that state. Nodes 701 themselves are anonymous and independent of each other—there is no explicit control flow between the nodes 701 other than that provided through preconditions to node actions. A coordination model based around expressing coordination structures as first-order entities and focusing on collecting reasoning and context. Control flow can be made outside of the smart space 700 through nodes 701 and the applications serving the nodes 701 explicitly sharing details of their external interfaces through the smart space 700. The responsibilities of nodes 701 range from user-interaction to reasoning and performing tasks such as truth maintenance, belief revision, information consistency management etc.

The nodes 701 access information in the smart space 700 through semantic information brokers (SIB) (e.g., SIBs 703a-703n) by connecting to any of the SIBs 703 making up the smart space 700 by whatever connectivity mechanisms (e.g., connectivity over a data network, the Internet, etc.) the SIBs 703 offer. Usually, the connection is over some network (e.g., communication network 205, data network, wireless network, telephony network, service provider network, etc.), and the nodes 701 are running on various devices. For example, the node 701 may be supported on any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the device supporting the node 701 can support any type of interface to the user (such as "wearable" circuitry, etc.).

Each SIB 703 is an entity performing information transaction operations, possibly co-operating with other SIBs 703, for the smart space 700. Signatures and supersignatures are stored in the information store 705 of the SIB 703 for subsequent analysis and querying. In one embodiment, an SIB 703 may be a concrete or virtual entity. Each SIB 703 supports nodes 701 interacting with other SIBs 703 through information transaction operations. In this embodiment, the smart space 700 includes SIBs 703a-703m each connected to respective information stores 705a-705c. Each information store 705 of the smart space 700 stores the information of the nodes 701, and any other information available over the smart space 700. This can include, for example, information of a current state or activity of the node 701, observations of the outside information world, maintenance information, and the like. Synchronization between these distributed, individual information stores 705 is asymmetric according to device and network capabilities as well as the user's needs in terms of security, privacy, etc. For example, private information about a user's family is stored at the user's home location where stricter information security policies can protect the information. The private information can then be augmented by non-private information at a website (e.g., a social networking website) without actually transferring the private information to the website. In this case, augmenting information is preferable to merging information due to, for instance, copyright and/or privacy concerns.

A smart space 700 transcends over many of the user's devices (e.g., mobile phones, media centers, personal computers, servers, routers, etc., including those depicted in FIG. 2) enabling the distribution of information and queries upon that information over any of the user's devices. For any node 701 accessing the information, the physical location of the node 701 and the location of the information are irrelevant, i.e., a node 701 sees the 'totality' of all information in that smart space 700. By way of example, the nodes 701 access the smart space 700 with basic operations including Insert (to insert information into a smart space), Remove (to remove information from a smart space), Update (to update information in a smart space, which is effectively an atomic remove and insert combination), Query (to query for information in a smart space), Subscribe (to set up a persistent query in a smart space such that a change in the query results is communicated to the subscribing node), etc. The nodes 701 communicate implicitly by inserting information to the smart space 700 and querying the information in the space 700. Relationships between static and dynamic information entities, as well as the information entities, are defined via inserted/retracted triples, subscriptions and queries. Static information represents data that does not change over time (e.g., a person's name). Dynamic information involves generating or modifying data over time (e.g., a person's age).

Interaction among smart spaces 700 is nominally conducted by the nodes 701 which encapsulate fine grained functionality to be distributed across any number of devices that have access to one or more of the smart spaces 700. The smart spaces 700 themselves can interact through merging and projection thereby enabling larger smart spaces 700 to be constructed either on a permanent or temporary basis. Moreover, the smart space 700 may be a personal space, a share/social space of at least two users, a group space, a public space of a community, a county, a state, or a county, etc., and the like. The aggregation of all smart spaces 700 constitutes the world of information (including the semantic web) which is also referred to as a smart space. A smart space 700 including the entire world of information also supports all services (including all platforms and vendors) available in the world, as well as all of the world's devices and equipment.

The smart space 700 is interoperable over different information domains, different service platforms, and different devices and equipment. For example, the smart space 700 accommodates transmission control protocol/Internet protocol (TCP/IP), Unified Protocol (UniPro) created by the Mobile Industry Processor Interface (MIPI) Alliance, Bluetooth protocol Radio Frequency Communication (RF-COMM), IPv6 over Low power Wireless Personal Area Networks (6LoWPAN), etc. The smart space 700 also covers technologies used for discovering and using services, such as Bluetooth/human interface device (HID) services, web services, services certified by the Digital Living Network Alliance (DLNA), the Network on Terminal Architecture (NoTA), etc. The smart space constitutes an infrastructure that enables scalable producer-consumer transactions for information, and supports multiparts, multidevices and multivendors (M3), via a common representation of a set of concepts within a domain (such as a RDF domain) and the relationships between those concepts, i.e. ontologies. The smart space 700 as a logical architecture has no dependencies on any network architecture but it is implemented on top of practically any connectivity solution. Since there is no specific service level architecture in the smart space 700, the smart space 700 has no limitation in physical distance or transport. The smart space 700 architecture allows user devices purchased at different times and from different vendors to work together. For example, the user can listen/watch/etc. To music/movies/etc. wherever the user is using one personal device in the vicinity of high quality speakers or display. In addition, the smart space 700 architecture allows application developers to mash-up services in different domains, instead of trying to port an application to all platforms and configurations. The smart space architecture also allows device manufacturers to make interoperable products, so that consumers have no concern about compatibility of different products and accessories.

Various embodiments are described herein with respect to search information in the semantic web and the smart space. Although the resource description framework (RDF) is frequently used as an example, it is contemplated that the approach described herein may be used with other semantic web tools, such as a variety of data interchange formats (e.g. RDF/XML, N3, Turtle, N-Triples), and notations such as RDF Schema (RDFS) and the Web Ontology Language (OWL), which are intended to provide a formal description of concepts, terms, and relationships within a given knowledge domain.

As mentioned, the smart space nodes 701 are distributed over different device and equipments, including the UE 201*a*, the personal computer 201*b*, the web service platform 203*a* and the communication platform 203*b*. The signature applications 207 may be configured to work in conjunction with the semantic information brokers 703, or (fully or partially) configured as a module of the semantic information brokers 703.

Figure 8:
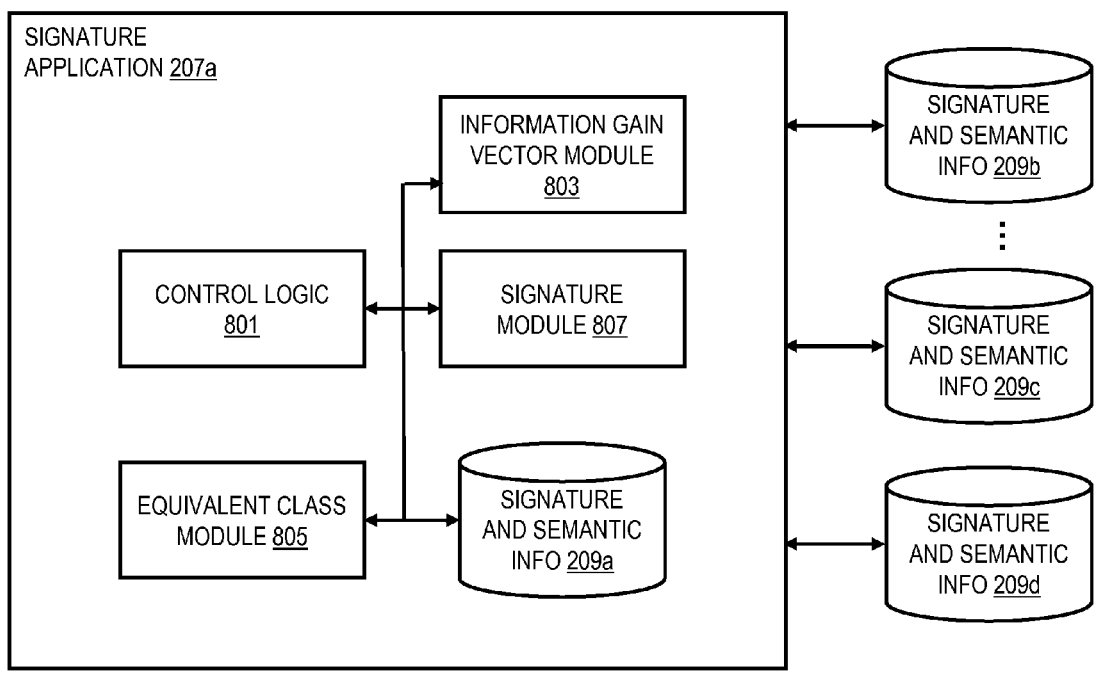
FIG. 8 is a diagram of the components of a signature application, according to one embodiment.

FIG. 8 is a diagram of the components of the signature application 207*a*, according to one embodiment. By way of example, the signature application (e.g., a widget) 207*a* includes one or more components for providing efficient information search in an information space 101 utilizing information signatures. Widgets are light-weight applications, and provide a convenient means for presenting information and accessing services. It is contemplated that the functions of these components may be combined in one or more components or performed by other components of equivalent functionality. It is contemplated that the functions of these components may be combined in one or more components or performed by other components of equivalent functionality. In this embodiment, the signature application 207*a* includes a control logic 801 for controlling the operation of the signature application, an information gain vector module 803 for generating an information gain vector, an equivalent class module 805 for generating an equivalent class, a signature module 807 for generating signature fragments and supersignature fragments (i.e., combinations of signature fragments), and the signature and semantic information database 209*a*. The signature applications 207*b*, 207*c*, 207*d* have the same or similar features of the signature application 207*a*.

The signature application 207*a* sets each of the queries at an identical query frequency, and constructs regions covered by the queries as an equivalent class with its equivalent class module 805.

In one embodiment, signatures of public information distributed from the signature and semantic information database 209*a* to the smart space (e.g., information space 101) to make them widely available, while signatures of private information are stored in locations designated by the information owner.

As such, unstructured and semi-structured information can be perceived, aggregated and processed at different levels, starting from low-level signal representation (e.g., machine readable codes) up to high abstraction level by being captured and serialized through information representation formats (e.g., RDF). As mentioned, the convention methods transform various unstructured/semi-structured data to a structured format (e.g., the XML format) of s fixed domain (e.g., RDF). As such, all possible properties are taken only for the domain and are subject to the limitation of the domain. The system 200 brings data of unstructured and semi-structured formats of different domains (e.g., the RDF domain and the signature domain) into a signature domain which maintains initially given information in a lossless manner, provides more flexibilities in analyzing qualitative properties of the initially given information, generates more meaningful information building blocks (i.e., signature fragments and combinations thereof), and responds to search queries more efficiently and effectively with the signature fragments and their combinations.

The system 200 keeps the original information intact and lossless after mapping into the mapped information state space (i.e., the signature domain), and also after reversing back to the originally given information state space. In one embodiment, a mapped signature domain in a mapped signature space is developed and used to explore and analyze the properties for the RDF domain in the semantic web.

In yet another embodiment, trajectory traversing (e.g., view), is done either by slicing (via Poisson methods or multimodal tracking) or by emphasizing any particular "aspect" (rules, queries etc). Navigation is implemented through trackable values of the supersignatures, and the distance to a targeted information fragment is measured by either disparity between a supersignature and a signature for search, or by means of a value of a corresponding superpolynomial. More details of trajectory traversing are described in an article by Patrik Thiran and Martin Hasler which is entitled "Information Processing Using Stable And Unstable Oscillations: A Tutorial" Third IEEE International Workshop on Cellular Neural Networks and their Applications, Rome, Italy, Dec. 18-21, 1994, pp. 127-136, which is hereby incorporated by reference. In this article, artificial neural networks (ANN) made up of interconnecting artificial neurons are used as a computational model for information navigation and trajectory traversing.

The above-described embodiments identify differences between any information fragments, allow search for particular information in the signature domain, and support various inference (mapped) actions for the primary information domain (e.g., the RDF domain) via the signature domain. In addition, updates of the signatures are accounted by trajectory and the signatures synthesis process.

The above-described embodiments utilize the properties of the signature domain and combines the properties with two mapped information state space representations. As a result, the above-described embodiments provide an efficient and scalable approach for searching the particular information fragment. A signature fragment has at least one overlapping portion with another signature fragment, and the processes of primary recombinations of signature fragments including splitting into finer signature fragments, merging (into "supersignature fragments"), restricting (e.g., splitting or merging) and projecting (in/out of the signature domain or the information space).

The above-described embodiments efficiently navigates, traverses and searches for the finite information fragment in the scope of structured, semi-structured and unstructured information, tracks the most relevant pieces of the information, provides a scalable mechanism, increases device energy efficiency, and efficiently utilizes different computing platforms.

Considered as a part of the smart space architecture, the above-described embodiments enable a dynamic fluid information searching/storing, and relaxes fixed data structures and semantics constraints. In addition, the above-described embodiments enable any number of information users to search concurrently and anonymously connecting to any information gateways or nodes.

The above-described embodiments slice the data stream, extract signatures to provide signature fragments (with overlapping portions thus longer/bigger than simply sliced fragments, i.e., backbone fragments), and store the signature fragments in the signature domain. In addition, the above-described embodiments synthesize the signature fragments into supersignature fragments, to further reduce independency of the backbones fragments, to flexibly adjust the dependency based upon the choice of signatures, to save storage space, to search/merge information quicker and to reduce redundancy of saving the same backbone fragments. Further more, the above-described embodiments easily reconstruct a data stream if it is later destroyed.

The processes described herein for creating and utilizing information signatures may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
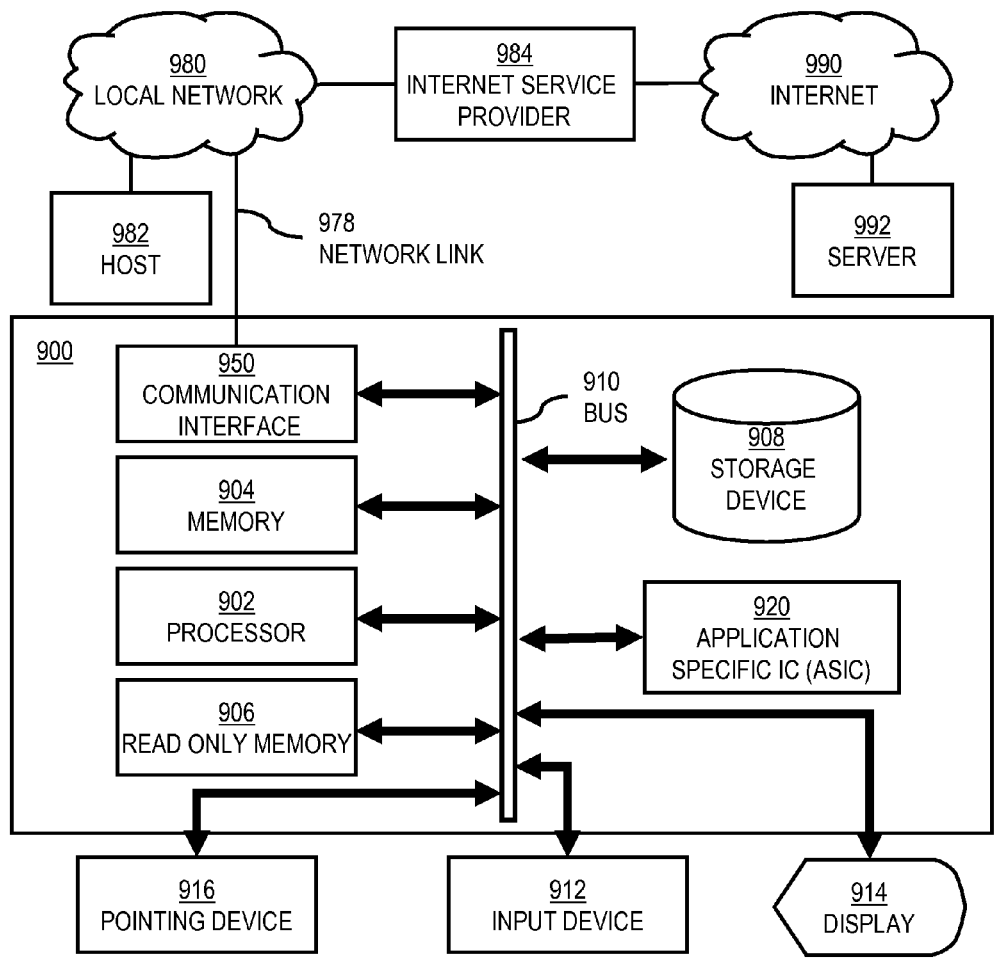
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to create and utilize information signatures as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of creating and utilizing information signatures.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to create and utilize information signatures. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for creating and utilizing information signatures. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for creating and utilizing information signatures, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for creating and utilizing information signatures.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990. A computer called a server host 992 connected to the Internet hosts a process that provides a service in response to information received over the Internet. For example, server host 992 hosts a process that provides information representing video data for presentation at display 914.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
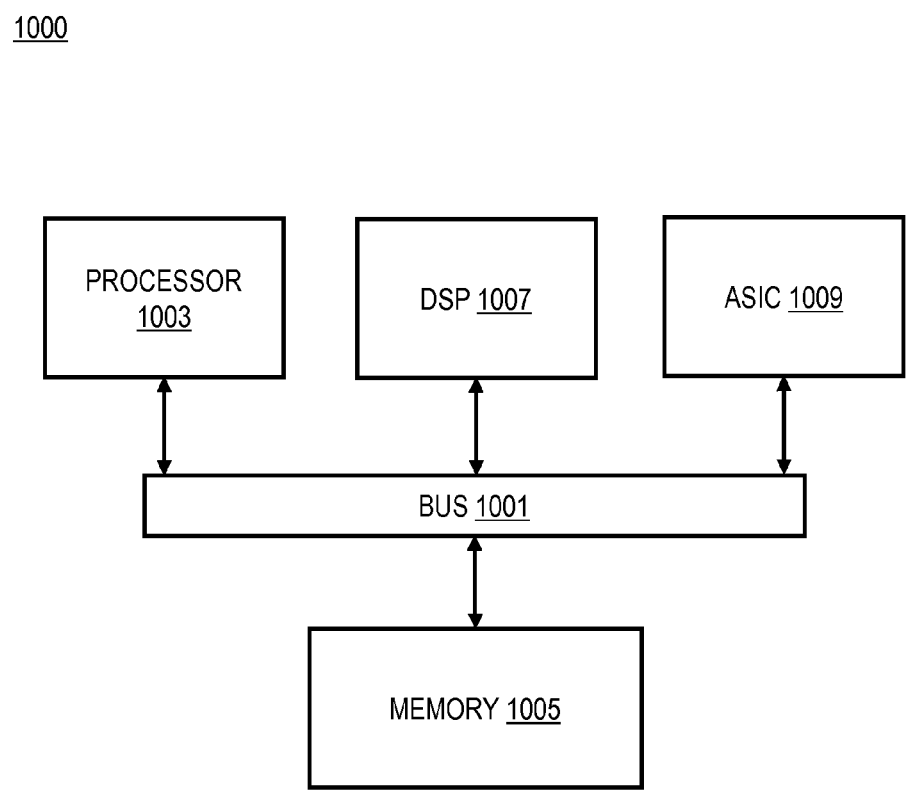
FIG. 10 is a diagram of a chip set that can be used to implement an embodiment of the invention.

FIG. 10 illustrates a chip set 1000 upon which an embodiment of the invention may be implemented. Chip set 1000 is programmed to create and utilize information signatures as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of creating and utilizing information signatures.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to create and utilize information signatures. The memory 1005 also stores the data associated with or generated by the execution of the inventive steps.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of creating and utilizing information signatures. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1207 provides a display to the user in support of various applications and mobile terminal functions that perform or support the steps of creating and utilizing information signatures. The display unit 1207 includes display circuitry configured to display at least a portion of a user interface of the mobile terminal (e.g., mobile telephone). Additionally, the display unit 1207 and display circuitry are configured to facilitate user control of at least some functions of the mobile terminal. An audio function circuitry 1109 includes a microphone 1111 and microphone amplifier that amplifies the speech signal output from the microphone 1111.

The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to create and utilize information signatures. The MCU 1103 also delivers a display command and a switch command to the display 1207 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving queries over information sources;
    for each of the queries, generating a polynomial by defining each query against the information sources as input parameters in polynomial form;
    providing irreducible polynomials over a finite field of a degree of orthogonality by factoring polynomials generated from the queries;
    adjusting the degree of orthogonality of the irreducible polynomials to provide adjusted irreducible polynomials, each of which is a signature and corresponds to a signature fragment, such that the signature fragments have overlapping portions; and
    causing at least in part storage of the signatures or the signature fragments in a signature domain over an information space.

2. The method of claim 1, further comprising:
    for each of the queries, searching for signature fragments corresponding to each query; and
    responding to each query with the searched signature fragments.

3. The method of claim 2, further comprising:
selectively combining signatures into supersignatures by multiplying irreducible polynomials corresponding to the signatures, the supersignatures corresponding to supersignature fragments;
causing at least in part storage of the supersignature fragments in the signature domain;
for each of the queries, searching for a supersignature fragment correspond to each query; and
responding to each query with the searched signature fragments, the supersignature fragments, or a combination thereof.

4. The method of claim 3, further comprising:
comparing a difference between a target information fragment and a signature or supersignature fragment by comparing polynomials corresponding to the fragments or by comparing values of the corresponding polynomials.

5. The method of claim 3, further comprising:
receiving a request to reconstruct the queries; and
reconstructing the queries from the signature fragments, the supersignature fragments, or a combination thereof.

6. The method of claim 1, wherein the signature fragment constitutes a finest lossless component in an information representation format or structure that has one or more overlapping portions with one or more other signature fragments.

7. The method of claim 1, further comprising:
adjusting sizes of the overlapping portions and the signature fragments by adjusting the degree of orthogonality of the irreducible polynomials.

8. An apparatus comprising:
at least one processor; and
at least one memory including computer program code,
the at least one memory and the computer program code configured to, with the at least one processor, cause the apparatus to perform at least the following,
receive queries over information sources;
for each of the queries, generate a polynomial by defining each query against the information sources as input parameters in polynomial form;
provide irreducible polynomials over a finite field of a degree of orthogonality by factoring polynomials generated from the queries;
adjust the degree of orthogonality of the irreducible polynomials to provide adjusted irreducible polynomials, each of which is a signature and corresponds to a signature fragment, such that the signature fragments have overlapping portions; and
cause at least in part storage of the signatures or the signature fragments in a signature domain over an information space.

9. An apparatus of claim 8, wherein the apparatus is further caused to:
for each of the queries, search for signature fragments corresponding to each query; and
respond to each query with the searched signature fragments.

10. An apparatus of claim 9, wherein the apparatus is further caused to:
selectively combine signatures into supersignatures by multiplying irreducible polynomials corresponding to the signatures, the supersignatures corresponding to supersignature fragments;
cause at least in part storage of the supersignature fragments in the signature domain;
for each of the queries, searching for a supersignature fragment correspond to each query; and
respond to each query with the searched signature fragments, the supersignature fragments, or a combination thereof.

11. An apparatus of claim 10, wherein the apparatus is further caused to:
compare a difference between a target information fragment and a signature or supersignature fragment by comparing polynomials corresponding to the fragments or by comparing values of the corresponding polynomials.

12. An apparatus of claim 10, wherein the apparatus is further caused to:
receive a request to reconstruct the queries; and
reconstruct the queries from the signature fragments, the supersignature fragments, or a combination thereof.

13. An apparatus of claim 8, wherein the signature fragment constitutes a finest lossless component in an information representation format or structure that has one or more overlapping portions with one or more other signature fragments.

14. An apparatus of claim 8, wherein the apparatus is further caused to:
adjust sizes of the overlapping portions and the signature fragments by adjusting the degree of orthogonality of the irreducible polynomials.

15. A computer-readable storage medium carrying one or more sequences of one or more instructions which, when executed by one or more processors, cause an apparatus to perform at least the following steps:
receiving queries over information sources;
for each of the queries, generating a polynomial by defining each query against the information sources as input parameters in polynomial form;
providing irreducible polynomials over a finite field of a degree of orthogonality by factoring polynomials generated from the queries;
adjusting the degree of orthogonality of the irreducible polynomials to provide adjusted irreducible polynomials, each of which is a signature and corresponds to a signature fragment, such that the signature fragments have overlapping portions; and
causing at least in part storage of the signatures or the signature fragments in a signature domain over an information space.

16. A computer-readable storage medium of claim 15, wherein the apparatus is caused further to perform:
for each of the queries, searching for signature fragments corresponding to each query; and
responding to each query with the searched signature fragments.

17. A computer-readable storage medium of claim 16, wherein the apparatus is caused further to perform:
selectively combining signatures into supersignatures by multiplying irreducible polynomials corresponding to the signatures, the supersignatures corresponding to supersignature fragments;
causing at least in part storage of the supersignature fragments in the signature domain;
for each of the queries, searching for a supersignature fragment corresponding to each query; and
responding to each query with the searched signature fragments, the supersignature fragments, or a combination thereof.

18. A computer-readable storage medium of claim 17, wherein the apparatus is caused further to perform:
comparing a difference between a target information fragment and a signature or supersignature fragment by comparing polynomials corresponding to the fragments or by comparing values of the corresponding polynomials.

19. A computer-readable storage medium of claim 17, wherein the apparatus is caused further to perform:
receiving a request to reconstruct the queries; and
reconstructing the queries from the signature fragments, the supersignature fragments, or a combination thereof.

20. A computer-readable storage medium of claim 15, wherein the signature fragment constitutes a finest lossless component in an information representation format or structure that has one or more overlapping portions with one or more other signature fragments.

* * * * *